US005517469A

United States Patent [19]

Wiget

[11] Patent Number: 5,517,469

[45] Date of Patent: May 14, 1996

[54] TIMEPIECE DRIVEN BY A SOURCE OF MECHANICAL ENERGY AND REGULATED BY AN ELECTRIC CIRCUIT

[75] Inventor: Fridolin Wiget, Neuchâtel, Switzerland

[73] Assignee: Asulab S.A., Bienne, Switzerland

[21] Appl. No.: 418,461

[22] Filed: Apr. 7, 1995

[30] Foreign Application Priority Data

Apr. 25, 1994 [CH] Switzerland .......................... 01266/94

[51] Int. Cl.[6] ........................................ H02P 9/04

[52] U.S. Cl. .......................... 368/140; 368/155; 368/157; 368/203; 322/29

[58] Field of Search .............................. 322/29; 368/148, 368/149, 203–205, 155–157, 140

[56] References Cited

U.S. PATENT DOCUMENTS 3,807,164 4/1974 Zaisky et al. .
3,937,001 2/1976 Berney .
3,952,497 4/1976 Schulz et al. .
4,169,992 10/1979 Nash ........................................ 322/29
4,214,434 7/1980 Sutter .
4,361,409 11/1982 Sutter .
4,799,003 1/1989 Tu et al. .

*Primary Examiner*—Bernard Roskoski
*Attorney, Agent, or Firm*—Pollock, Vande Sande & Priddy

[57] ABSTRACT

The hands of the timepiece are connected to a barrel spring which also drives the rotor of a generator at a speed greater than a desired speed Vc. The electric energy supplied by the generator energizes a slaving circuit that includes a transistor which short-circuits the coil of the generator and thus brakes the rotor down to a speed less than the desired speed Vc when a comparator indicates that this rotor is ahead with respect to its theoretical angular position. A limiting circuit limits the duration of the braking action of the rotor to a fraction of the period of the a.c. voltage supplied by the generator. This arrangement ensures that the slaving circuit is adequately energized even if the rotor is substantially ahead.

2 Claims, 1 Drawing Sheet

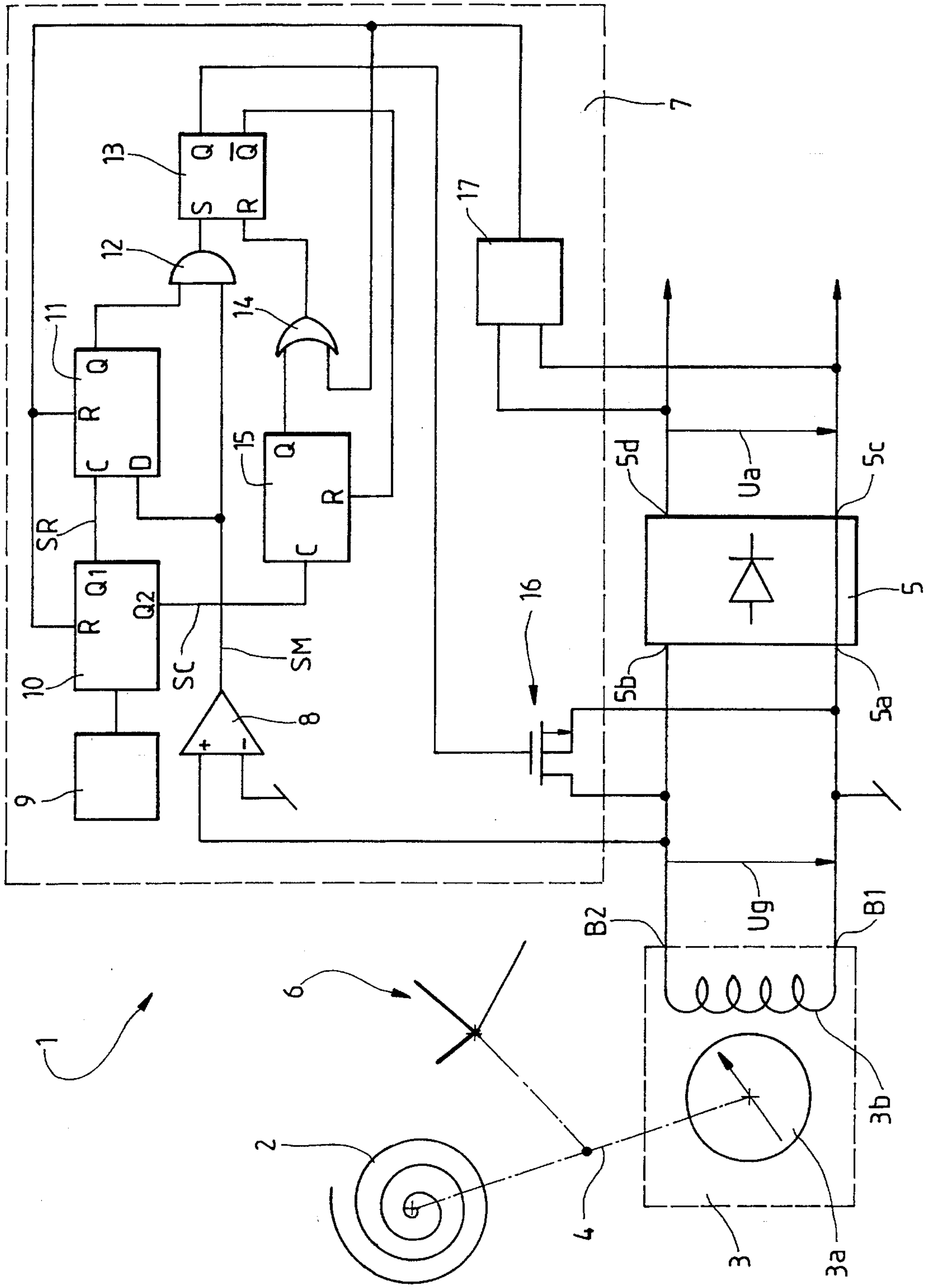
1
2
3
3a
3b
4
5
5a
5b
5c
5d
6
7
8
9
10
11
12
13
14
15
16
17
SR
SC
SM
Ug
Ua
B1
B2

TIMEPIECE DRIVEN BY A SOURCE OF MECHANICAL ENERGY AND REGULATED BY AN ELECTRIC CIRCUIT

BACKGROUND OF THE INVENTION

The present invention relates to a timepiece having:

- an electrical energy generator comprising a rotor and means for supplying electrical energy in response to rotation of the rotor;
- a source mechanical energy mechanically coupled to the rotor to cause rotation of the rotor at a speed greater than a set desired speed; and
- slaving means for slaving the rotational speed of the rotor to the desired speed which is energized by the electrical energy and which includes:
- measuring means coupled to the generator for producing a plurality of measurement pulses, each of the measurement pulses being produced in response to the rotor travelling through a particular angular position;
- reference means for producing a plurality of periodic reference pulses having a period equal to that of the measurement pulses when the rotor is rotating at the desired speed;
- comparing mean for supplying a comparison signal representative of the difference between, on the one hand, a first number which is the number of the reference pulses that are produced as from a determined initial instant and, on the other hand, a second number which is the number of the measurement pulses that are produced as from the determined initial instant, the comparison signal having a first state and a second state dependent on whether the first number is less than or, respectively, greater than the second number; and
- braking means responsive to a command signal for applying to the rotor a braking torque that imposes upon the rotor a, speed of rotation less than the desired speed.

A timepiece having these features, described for instance in U.S. Pat No. 3,937,001, has the same accuracy as a conventional electronic timepiece because the reference pulses, whose frequency determines the rotational speed of the generator's rotor and hence of the hands displaying the ongoing time, are produced from a signal supplied by a quartz oscillator.

Further, this timepiece has neither cell nor accumulator since its electronic circuits are energized by the electrical energy provided by its generator whose rotor is connected to its source of mechanical energy, formed by a barrel spring similar to that used in conventional mechanical timepieces.

This represents a clear advantage in relation to a conventional electronic timepiece whose circuits are supplied by a cell or an accumulator, which have a limited life.

In the timepiece described in U.S. Pat. No. 3,9373,001, mentioned above, the means for braking the generator's rotor are formed by a resistor connected in series with an electronic switch, the arrangement formed by this resistor and this switch being connected in parallel with the generator's coil.

Further, this switch is controlled directly by the comparison signal so as to be permanently closed when the latter is in its first state, i.e. as long as the generator's rotor is ahead with respect to the position it would have occupied had it always been rotating at its desired speed.

It may therefore happen for this rotor to be braked without interruption for quite a long time, particularly if it had before been strongly accelerated by an angular shock.

The electronic circuits of the timepiece are energized by a d.c. voltage supplied by a circuit for rectifying the a.c. voltage produced by the generator.

The value of this d.c. voltage, which depends on the value of this a.c. voltage, must obviously be at all times sufficient for these electronic circuits to operate properly.

Now when the generator's rotor is braked, the lower the braking resistance, the lower the a.c. voltage produced by the generator, that a.c. voltage being obviously nil if the braking resistance is itself nil.

If the generator's rotor were braked for only relatively short periods of time, the electronic circuits of the timepiece could be energized, during these braking periods, by the electrical energy that has accumulated in the capacitor or capacitors generally comprised by the rectifier circuit energizing these circuits, even if the value of the braking resistance were nil.

But, as explained above, the generator's rotor may be braked without interruption for quite a long period of time. It is therefore practically out of the question to choose a nil value for the braking resistance because the capacitor of the rectifier circuit would then have to have a very large capacitance and would therefore be rather bulky and expensive. Besides, it would not be possible to ascertain for sure the capacitance the capacitor should have since the maximum length of time during which the generator's rotor may be braked cannot be anticipated.

SUMMARY OF THE INVENTION

When the braking resistor is connected in parallel with the generator's coil, the a.c. voltage produced by this coil is decreased firstly because of the rotational speed drop that results from this connection and secondly because of the voltage drop produced in the generator's coil by the current being absorbed by the braking resistor.

As a result, for the energizing voltage of the timepiece's electronic circuits to be always sufficient, it is not enough for the value of the braking resistance not to be nil, as indicated earlier, but this value must also be relatively high.

However, the smaller the braking resistance, the greater the braking torque which is applied to the generator's rotor, the braking torque being greatest when the braking resistance is nil. This braking torque must obviously impose on the generator's rotor a rotational speed that is less than its desired speed, whatever may be the driving torque supplied by the barrel spring.

For the maximum value of this driving torque to be as large as possible, something that would favourably affect the timepiece's autonomy, i.e. the length of time during which it would be able to work without its barrel spring having to be rewound, the braking torque must also be very large, which implies that the braking resistance must have a low value. Preferably, this resistance should have a zero value.

The rotor's braking resistance must therefore satisfy two contradictory conditions. Firstly, it must be sufficiently large, and in any case not nil, for the energizing voltage of the electronic circuits to be sufficient in all circumstances. Secondly, it must be sufficiently small, and preferably nil, for the braking torque to be large and for the rotational speed of the rotor, when being braked, to be less than its desired speed even when the driving torque supplied by the mechanical energy source is maximum.

For the first above condition to be more easily satisfied, it would in theory be possible to increase the number of turns in the generator's coil. But a coil having a large number of turns is bulky and may be difficult to house in the limited space available in a timepiece of small volume such as a wrist watch. Or else, if one opts to produce this coil with a wire having a sufficiently small diameter for it not to be too bulky, it becomes difficult to manufacture and its cost price increases.

One must also take into account the fact that a coil having a large number of turns made of small diameter wire has a large internal resistance which, on the one hand, adds to the braking resistance and reduces the rotor's braking torque and, on the other hand, causes a drop in the a.c. voltage produced by the generator when the current supplied by the generator flows through the coil.

In theory, one could also use a voltage multiplying rectifier circuit to rectify the a.c. voltage produced by the generator's coil. But such a circuit involves quite a large number of capacitors, which are bulky components, and of diodes whose threshold voltage is not substantially less than the voltage that is needed to energize the timepiece's electronic circuits. This means, in practice, that one can only use a simple rectifier or, at most, a voltage doubling rectifier to rectify the a.c. voltage produced by the generator.

For the second of the above-mentioned conditions to be more easily satisfied, one could of course reduce the maximum value of the driving torque supplied by the barrel spring to the generator's rotor. But the timepiece's autonomy would then be reduced, something that is of course not desirable.

An object of the present invention is to propose a timepiece of the same kind as that described in patent U.S. Pat. No. 3 937 001 mentioned above, but which does not suffer from its drawbacks, i.e. a timepiece wherein the value of the rotor's braking resistance may be very low, possibly even nil, without having to provide the generator's coil with a large number of turns and without there being any risk, under whatever circumstances, of the voltage energizing the electronic circuits becoming insufficient for the latter to operate properly. Further, this very low, possibly even nil, value of this braking resistance makes it possible to select the barrel spring that drives the generator's rotor in such a manner that its maximum torque will be large and that the timepiece's autonomy will hence be greater, all other things being equal, than that of the above-mentioned known timepiece.

This object is achieved by a timepiece having the following features:

- an electrical energy generator comprising a rotor and means for supplying electrical energy in response to rotation of the rotor;
- a source of mechanical energy mechanically coupled to the rotor to cause the rotor to rotate at a speed greater than a set desired speed; and,
- slaving means for slaving the rotational speed of the rotor to the desired speed, the slaving means being electrically connected to the generator to receive electrical energy therefrom and comprising:
- measuring means coupled to the generator for producing a plurality of measurement pulses, each of the measurement pulses being produced in response to the rotor travelling through a particular angular position so as to determine its actual angular position;
- reference means for producing a plurality of periodic reference pulses having a period equal to that of the measurement pulses when the rotor is rotating at the desired speed, the reference pulses being independent of the measurement pulses and being representative of a theoretical angular position of the rotor;
- comparing means for supplying a comparison signal representative of the difference between a first number, which is the number of the reference pulses that are produced from a determined instant, and a second number, which is the number of the measurement pulses that are produced from the determined instant, the comparison signal having a first state and a second state dependent on whether the first number is less than or greater than the second number respectively;
- braking means responsive to a command signal for applying to the rotor a braking torque that imposes upon the rotor a speed of rotation that is less than the desired speed, the braking means then short-circuiting the means for supplying electrical energy;
- and control means responsive to each of the measurement pulses only when the comparison signal is in the first state to produce a command signal in the form of a command pulse of fixed duration so that the braking means only applies a braking torque to the rotor when the latter is leading with respect to the theoretical angular position.

DESCRIPTION OF THE DRAWING

Other objects and advantages of the present invention will become apparent from the following description that will be made with reference to the accompanying drawing in which:

FIG. 1, the only figure, diagrammatically represents an embodiment of the timepiece according to the invention.

DETAILED DESCRIPTION OF THE INVENTION

In the embodiment shown diagrammatically and by way of non limitative example in FIG. 1, the timepiece according to the invention, generally referenced 1, includes a source of mechanical energy consisting of a barrel spring. This barrel spring, referenced 2, has only been shown in a very diagrammatic way as it can be of the same kind as any one of the well-known barrel springs used in conventional mechanical timepieces.

The barrel spring 2 is coupled to a manual or automatic winding mechanism which has not been shown as it may be similar to any one of the well-known winding mechanisms that are also used in conventional mechanical timepieces.

The barrel spring 2 is coupled mechanically to the rotor *3a* of an electrical energy generator 3 via a gear-train 4 symbolized by a chain-dotted line. The generator 3 also has a coil *3b*, and will not be described in detail as it may be made in various ways that are well known to specialists.

It will simply be mentioned that, in the present example, the rotor *3a* has a bipolar magnet which has been simply symbolized by an arrow representing its magnetization axis.

It will also be mentioned that the coil *3b* is magnetically coupled to the permanent magnet of rotor *3a*, for instance via a stator not shown, so as to produce across its terminals B1 and B2, in response to any rotation of rotor *3a*, an a.c. voltage Ug having a period equal to the rotation period of rotor *3a*, i.e. to the time taken by rotor *3a* to carry out one revolution. The terminals B1 and B2 of coil *3b* are of course the output terminals of generator 3.

The timepiece 1 further includes a rectifier circuit 5 whose inputs *5a* and *5b* are respectively connected to the terminals B1 and B2 of generator 3 and whose outputs *5c* and 5d supply a voltage Ua that is at least substantially d.c. in response to the a.c. voltage Ug produced by generator 3. The voltage Ua serves to energize the various electronic circuits, described later, via conductors not shown.

The rectifier 5 will not be described in detail as it can be like any one of the rectifiers that are well known to specialists. It will simply be mentioned that rectifier 5 comprises, in conventional manner, a smoothing capacitor connected across its output terminals 5*c* and 5*d* but not shown.

In the present example, the terminals 5*a* and 5*c* of rectifier 5 are connected to one another and to the terminal B1 of generator 3. Further, the potential of these three terminals 5*a*, 5*c* and B1 has arbitrarily been chosen as the reference potential, or earth, and all voltages hereinafter mentioned in the description will be voltages measured with respect to this reference potential.

On this arbitrary basis, the a.c. voltage Ug is therefore symmetrical in relation to this reference potential when rotor 3*a* rotates at constant speed.

Moreover, in the following portion of this description, the various signals will be described as being in the logic state "0" or in the logic state "1" depending on whether the potential of the points where they are measured is substantially equal to the reference potential or to the potential of the terminal 5*d* of rectifier 5, respectively.

The timepiece 1 moreover includes means for displaying the actual time that consist in this example of conventional hands, referenced 6, but may also consist of other well-known elements such as disks, drums, etc. The timepiece 1 may also include one or more auxiliary display devices such as a calendar, moon phase or other device. Such an auxiliary device has not been shown.

The hands 6 and, as the case may be, the auxiliary device or devices are mechanically connected to the barrel spring 2 and to the rotor 3*a* of generator 3 via a gear-train of which at least a portion may be common with a portion of the gear-train 4. In FIG. 1, the gear-train that is connected to the hands 6 has not been referenced separately, and is also symbolized by a chain-dotted line.

The timepiece 1 also includes a mechanism for setting the hands 6 and, as the case may be, for correcting the auxiliary device or devices, that has not been shown as it may be similar to any one of the various mechanisms of this kind well known to specialists.

The rotational speed of the hands 6, which must of course have a well-regulated and constant mean value, is controlled by a slaving circuit 7 for slaving the rotational speed of rotor 3*a* to a desired speed that will be termed Vc hereinafter.

The elements of slaving circuit 7 that determine the rotational speed of rotor 3*a* and which will be described below, as well as the gear-train 4, are so arranged that the hands 6 rotate at their normal speeds when the rotor 3*a* rotates at the desired speed Vc. It will be assumed that, in the present example, the desired speed Vc has been set at 4 revolutions per second.

Furthermore, and for a reason that will become clear later in this description, the characteristics of barrel spring 2 and of the various elements it drives, and those of generator 3, are so chosen that the mean rotational speed of rotor 3*a* will be greater than the desired speed Vc as long as the barrel spring 2 is not almost fully let down, provided coil 3*b* is not short-circuited. Also, these characteristics are so chosen that this mean rotational speed will be less than the desired speed Vc if coil 3*b* is short-circuited, in circumstances described below, even when the barrel spring is fully wound up and the driving torque it supplies is therefore at its maximum value.

The above-mentioned slaving circuit 7 includes a comparator 8 whose direct input is connected to the terminal B2 of generator 3 and whose inverse input is connected to the potential reference, so that the signal produced by its output, hereinafter termed signal SM, is alternately in the state "0" and in the state "1" depending on whether the voltage Ug supplied by generator 3 is negative or positive.

The period of signal SM is obviously equal to that of voltage Ug so that, in particular, the period of signal SM is of 250 milliseconds when the rotor 3*a* of generator 3 rotates at its desired speed Vc which is 4 revolutions per second in the present example.

Further, signal SM changes from its state "0" to its state "1" whenever the rotor 3*a* of generator 3 goes through a particular angular position which is that at which voltage Ug passes through its zero value on the rise.

Signal SM is thus both a signal for measuring the rotational speed of rotor 3*a* and a signal for detecting the passage of rotor 3*a* through the above-defined particular angular position.

The slaving circuit 7 further includes a source of a reference signal SR consisting in the present example of an oscillator 9, which may be a quartz oscillator, and a frequency divider circuit 10 having an output Q1 which supplies the signal SR in response to the signal produced by oscillator 9.

The oscillator 9 and the frequency divider 10 will not be described in detail as they may be made in a variety of ways that are well known to a man of the art. It will simply be mentioned that the oscillator 9 and the frequency divider 10 are so arranged that the period of signal SR will be the same as that of signal SM when the rotor 3*a* of generator 3 rotates at its desired speed Vc, i.e. 250 milliseconds in the present example.

This result may be obtained, still by way of example, by using for the oscillator 9 an oscillator similar to that used in a great majority of electronic timepieces and which issues a signal having a frequency of 32768 Hz, and by making the frequency divider 10 in the well-known form of a series of thirteen bistable multivibrators often termed flip-flops.

It will also be mentioned that the frequency divider 10 comprises a second output, designated Q2, that issues a signal SC having a much shorter period, e.g. about one hundred times shorter, than that of signal SR, and whose usefulness will be made clear below. In the present example, signal SC may be supplied by the output of the sixth flip-flop of frequency divider 10 and thus have a period of about 1.95 millisecond.

The slaving circuit 7 furthermore includes a reversible counter, or up-down counter, referenced 11. The counting input C of counter 11 is connected to the output Q of frequency divider 10 and hence receives signal SR, and its down counting input D is connected to the output of comparator 8 and hence receives signal SM.

The reversible counter 11 will not be described in detail as it may be made in various well-known ways. It will simply be stated that it is responsive to the rising edges of the pulses it receives, i.e. to changes from the logic state "0" to the logic state "1" of signals SR and SM. In other words, the content of counter 11, i.e. the binary number formed by the logic states "0" or "1" of the direct outputs of the various flip-flops constituting the counter, is increased by one unit at each rising edge of the signal SR pulses and is reduced by one unit at each rising edge of the signal SM pulses. The counter 11 further includes well-known means for removing any ambiguity due to any kind of superposition in time of the pulses it receives at its inputs C and D.

Further, the counter 11 has a reset input R and is so arranged that its content is maintained at zero value as long as the input R is in the logic state "1".

It should also be remembered that if counter 11 is made up of n flip-flops, its content may assume any value greater than or equal to zero and less than or equal to $2^n-1$.

Furthermore, the operation of counter 11 is cyclic, i.e. in particular that when its content is equal to zero, this content assumes the value $2^n-1$ in response to a pulse applied to its down counting input D.

In an arbitrary way and for a reason that will become clear below, the values of the content of counter 11 that are greater than or equal to zero and less than or equal to $2^{(n-1)}$ will be termed positive values, and the values of the content of counter 11 that are greater than $2^{(n-1)}$ and less than or equal to $2^n-1$ will be termed negative values. A man of the art will readily appreciate that, on the above basis, the output Q of counter 11, which is formed in conventional manner by the direct output of the last of its flip-flops, is in the logic state "0" when the content of counter 11 is positive and in the logic state "1" when this content is negative.

The output Q of the reversible counter 11 is connected to a first input of an AND gate 12 whose second input is connected to the output of comparator 8.

The output of gate 12 is connected to the input S of an R-S type flip-flop 13 whose input R is connected to the output of an OR gate 14.

Like the above-described reversible counter 11, flip-flop 13 is responsive to the rising edges of the pulses it receives on its inputs S and R. In other words, the direct output Q and the reverse output $\overline{Q}$ of flip-flop 13 respectively assume a logic state "1" and a logic state "0" in response to each rising edge of the signal that is applied to its input S, and respectively assume a logic state "0" and a logic state "1" in response to each rising edge of the signal that is applied to its input R.

A first input of OR gate 14 is connected to the output Q of a simple, non reversible counter 15.

Counter 15 is made up, in the present example, of five flip-flops that are series-connected in conventional manner so that its output Q, which is the direct output of its fifth flip-flop, changes from the state "0" to the state "1" when its content changes from the value fifteen to the value sixteen.

The counting input C of counter 15 is connected to the output Q2 of frequency divider 10 and hence receives signal SC, and its reset input R is connected to the reverse output $\overline{Q}$ of flip-flop 13.

Again, as with the reversible counter 11, counter 15 is responsive to the rising edges of the signal that is applied to its counting input C, and its content is maintained at zero value as long as its input R is in the logic state "1".

The slaving circuit 7 further includes means for electrically braking the rotor **3*a* of generator 3, which means consist in the present example of an n-type MOS transistor, referenced 16, whose source and drain are respectively connected to the terminals B1 and B2 of generator 3, and whose gate is connected to the direct output Q of flip-flop 13**.

A man of the art will readily see that the transistor 16 is blocked or conductive depending on whether its gate is in the logic state "0" or "1" since it is of the n-type and its source is at reference potential.

The slaving circuit 7 furthermore includes an initialization circuit 17 having two inputs respectively connected to the terminals **5*c* and 5*d* of rectifier 5 and an output connected, on the one hand, to the reset inputs R of the frequency divider 10 and of the reversible counter 11 and, on the other hand, to the second input of OR gate 14**.

The initialization circuit 17 will not be described in detail as it can be made in various well-known ways. It will simply be mentioned that it is so arranged that its output produces a short initialization pulse at the instant when the voltage Ua reaches, on the rise, a set threshold value, which is equal to or slightly greater than the value at which the various other components of the slaving circuit 7 begin to operate properly. This instant will hereinafter be termed the initialization instant t0.

When the barrel spring 2 is completely let down and the rotor **3*a* of generator 3 is not rotating, the voltages Ug and Ua are obviously nil and the timepiece 1** is not working.

If the barrel spring 2 is then rewound, there comes a time when the rotor **3*a*** starts turning and when the voltages Ug and Ua begin to increase.

At the above-defined instant t0, the pulse produced by the initialization circuit 17 causes the frequency divider 10 and the reversible counter 11 to be reset whereby the outputs Q1 and Q2 of frequency divider 10 and the output Q of reversible counter 11 are put in the logic state "0".

The same initialization pulse is applied to the input R of flip-flop 13 via gate 14 thereby causing the outputs Q and $\overline{Q}$ of flip-flop 13 respectively to assume the logic state "0" and the logic state "1".

The logic state "0" of the output Q of flip-flop 13 causes transistor 16 to be blocked whereby the coil **3*b* of generator 3 is not short-circuited and the rotational speed of rotor 3*a* may reach and exceed the desired speed Vc. Also, the logic state "1" of the output $\overline{Q}$ of flip-flop 13 maintains the content of counter 15** at zero.

The operation of the timepiece 1 after instant t0 will only be broadly described hereinafter as a man of the art will have no trouble piecing together all of its details with the help of the explanations that have already been given.

In this description of the operation of timepiece 1, each of the instants when reference signal SR changes from its state "0" to its state "1" and when the content of counter 11 is hence incremented by one unit, will be termed reference instant tr. Also, each of the instants when the measurement signal SM also changes from its state "0" to its state "1" and when the content of counter 11 is hence decremented by one unit, will be termed measurement instant tm.

Further, the angular position rotor **3*a* should occupy at each reference instant tr had its mean rotational speed from instant t0** been equal to its desired speed Vc, will be termed its theoretical angular position.

It will be clear that the content of the reversible counter 11 is permanently representative of the difference between the number of pulses of signal SR that have been produced by frequency divider 10 from the instant t0 defined above and the number of pulses of signal SM that have been produced by comparator 8, which is the number of complete revolutions performed by the rotor **3*a* of generator 3, from the same instant t0**.

The content of counter 11 is thus also permanently representative of the lag or lead of rotor **3*a*** with respect to its theoretical angular position, this lag or lead possibly amounting to several revolutions.

When the content of counter 11 is positive just after one of the above-defined instants tm, it means that the rotor **3*a*** is lagging with respect to its theoretical angular position.

In such a case, the output Q of reversible counter 11 is in the logic state "0", whereby the output of AND gate 12 remains in the state "0" and the flip-flop 13 remains in the state in which its output Q is in the logic state "0". The transistor 16 remains blocked and, since the coil 3*b* of generator 3 is not short-circuited, the rotational speed of rotor 3*a* may remain at, or, as the case may be, tend to become greater than, the desired speed Vc, provided of course that the barrel spring 2 is still sufficiently wound.

The lag of rotor 3*a* with respect to its theoretical angular position thus tends to reduce to zero, as also the content of the reversible counter 11.

When the content of the reversible counter 11 is negative just after one of the instants tm hereinbefore defined, it means that the rotor 3*a* is leading with respect to its theoretical angular position.

In such a case, the output Q of counter 11 is in the logic state "1". As the signal SM is then also in the state "1", flip-flop 13 takes on the state in which its outputs Q and $\overline{Q}$ are respectively in the logic state "1" and the logic state "0".

As a result, the transistor 16 becomes conductive and short-circuits the coil 3*b* of generator 3. The rotor 3*a* is thus braked and its rotational speed drops to below the desired speed Vc.

As a result also, because the reset input R of counter 15 is now in the state "0", the content of counter 15 increases by one unit at each pulse of signal SC. When, in the present example, this content changes from value fifteen to value sixteen, i.e. about 31.25 milliseconds after flip-flop 13 has changed its state, the output Q of counter 15 changes to the logic state "1".

Flip-flop 13 then returns to the state in which its outputs Q and $\overline{Q}$ are respectively in the logic state "0" and in the logic state "1".

Transistor 16 is thus again blocked, so that rotor 3*a* is then no longer braked and its rotational speed may again increase.

It will be seen that the circuit comprised a gates 12 and 14, flip-flop 13 and counter 15 constitutes a circuit for limiting the duration of the braking of rotor 3*a* to a set fraction, ⅛ in the present example, of the period of the voltage Ug provided by generator 3.

If, just after the following instant tm, the output Q of reversible counter 11 is still in the logic state "1", the process just described is repeated, until the mean speed of rotor 3*a* from instant t0, which of course decreases whenever rotor 3*a* is braked, becomes lower than or equal to the desired speed Vc.

When this situation is reached, the output Q of reversible counter 11 takes on the logic state "0" and rotor 3*a* is no longer braked.

It will be seen that the mean speed of rotor 3*a*, when measured over a relatively long period of time, is equal to the desired speed Vc and, if the hands 6 have been time set at instant t0, they permanently display the right time with an accuracy equal to that of the frequency of reference signal SR.

It will also be seen that this result is obtained by braking rotor 3*a*, when it is leading with respect to its theoretical angular position, only for periods of limited duration, clearly less long than the time taken on average by rotor 3*a* to carry out one complete revolution. In the present example, this duration of the braking periods, which is determined by the frequency of signal SC and by the number of flip-flops making up counter 15, is about eight times shorter than the mean rotational period of rotor 3*a*.

During each of the rotor-braking periods, the voltage Ug produced by generator 3 is obviously nil since transistor 16 is conductive and is short-circuiting coil 3*b*.

But each of these braking periods starts at an instant when voltage Ug is in any case nil, and their duration only amounts to a rather small fraction of this voltage's period as has just been explained. During these braking periods, voltage Ug would then only have a relatively small value if coil 3*b* were not short-circuited and generator 3 would in any case only supply a very small, possibly even a nil, amount of energy to rectifier 5. But outside these braking periods, voltage Ug has a normal value, so that the amount of electrical energy supplied by generator 3 is hardly, if at all, diminished by the braking action of rotor 3*a*.

As a result, the generator 3 continues to supply the electrical energy that is needed for the operation of the slaving circuit 7 even when the rotor 3*a* is leading with respect to its theoretical angular position and is braked as has been described above, irrespective of the extent of the lead.

The smoothing capacitor or capacitors of rectifier 5 may therefore have relatively low capacitances since it is not necessary for them to energize the slaving circuit 7 over long periods of time as is the case with the known timepiece described in the above-mentioned patent U.S. Pat No. 3,937,001.

Further, and for the same reasons, it is quite possible, indeed preferable, for the braking means of rotor 3*a* to be made as described above, i.e. without including in the braking means any kind of resistor similar to the one that must necessarily be provided in the braking means of the timepiece described in patent U.S. Pat. No. 3,937,001.

In relation to this latter timepiece, the elimination of this resistor has the advantage of the braking action of rotor 3*a* being more effective, thereby increasing the maximum motor torque that is acceptable for barrel spring 2 and hence increasing the autonomy of timepiece 1.

A man of the art will readily see that many modifications may be made to the timepiece that has just been described without the latter stepping outside the framework of the present invention.

Thus, for instance, the rotor of the generator of a timepiece according to the invention may comprise, instead of the bipolar magnet of the rotor 3*a* of the above-described generator 3, either a multipolar permanent magnet, or a plurality of bipolar permanent magnets disposed at the periphery of a disc. In such cases, the a.c. voltage produced by the coil of this generator has a period that is equal to the ratio between the rotation period of the rotor and the number of pairs of poles of the multi-polar magnet or, respectively, of the number of bipolar magnets.

It is also possible to so produce the measurement signal, i.e. signal SM in the FIG. 1 example, in such a way that it changes to the state "1", for a limited duration, not only whenever the a.c. voltage produced by the timepiece's generator goes through its nil value on the rise, but also whenever this a.c. voltage goes through this nil value on the drop.

In such a case, the period of this measurement signal is equal to half that of the a.c. voltage produced by the generator, and the rotor of this generator is braked twice per period of this a.c. voltage when it is leading with respect to its theoretical angular position. It may then be necessary to reduce the duration of this rotor's braking periods to prevent the electrical energy supplied by the generator from becoming insufficient to adequately energize the electronic circuits of the timepiece.

In all of the cases just mentioned, one must of course so design the reference signal source, made up in the FIG. 1 example by oscillator 9 and frequency divider 10, in such a way that the period of this reference signal is equal to that of the measurement signal when the generator's rotor is rotating at its desired speed.

It would further be possible to modify the means that determine the duration of the braking periods of the generator's rotor, which consist in the FIG. 1 example of counter 15, in such a way that this period depends directly on the extent of this rotor's lead with respect to its theoretical angular position. Such a modification would make it possible to reduce the time that is needed for the rotor to resume its theoretical angular position after having been subjected to a large angular acceleration, due for instance to a violent shock, causing it to gain a lead of several revolutions relatively to this theoretical angular position.

What is claimed is:

1. A timepiece having:

an electrical energy generator comprising a rotor and means for supplying electrical energy in response to rotation of said rotor;

a source of mechanical energy mechanically coupled to said rotor to cause said rotor to rotate at a speed greater than a set desired speed; and slaving means for slaving the rotational speed of said rotor to said desired speed, said slaving means being electrically connected to said generator to receive electrical energy therefrom and comprising:

measuring means coupled to said generator for producing a plurality of measurement pulses, each of said measurement pulses being produced in response to said rotor travelling through a particular angular position so as to determine its actual angular position;

reference means for producing a plurality of periodic reference pulses having a period equal to that of said measurement pulses when said rotor is rotating at said desired speed, said reference pulses being independent of said measurement pulses and being representative of a theoretical angular position of said rotor;

comparing means for supplying a comparison signal representative of the difference between a first number, which is the number of said reference pulses that are produced from a determined instant, and a second number, which is the number of said measurement pulses that are produced from said determined instant, said comparison signal having a first state and a second state dependent on whether said first number is less than or greater than said second number respectively;

braking means responsive to a command signal for applying to said rotor a braking torque that imposes upon said rotor a speed of rotation that is less than said desired speed, said braking means then short-circuiting said means for supplying electrical energy;

and control means responsive to each of said measurement pulses only when said comparison signal is in said first state to produce a command signal in the form of a command pulse of fixed duration so that the braking means only applies a braking torque to the rotor when the latter is leading with respect to said theoretical angular position.

2. A timepiece according to claim 1, wherein said slaving means further comprises an initialization circuit for determining said determined instant at the moment that the electrical energy supplied by the generator reaches a set threshold value which is equal to or greater than the value at which said slaving means functions properly.

* * * * *